C. P. MACOWITZKY.
Valve-Gear for Steam-Engines.
No. 227,119. Patented May 4, 1880.
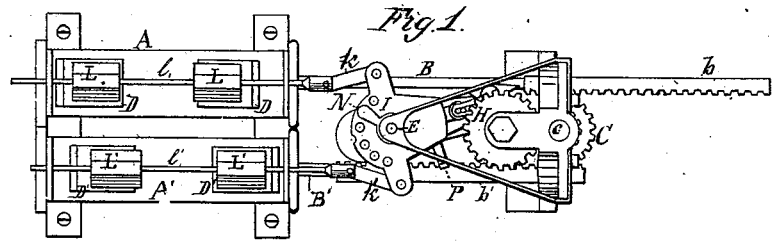
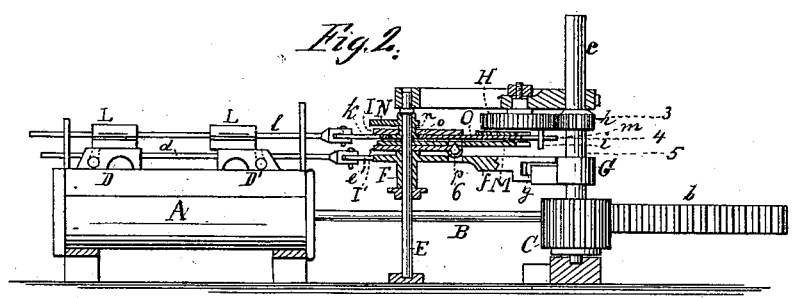
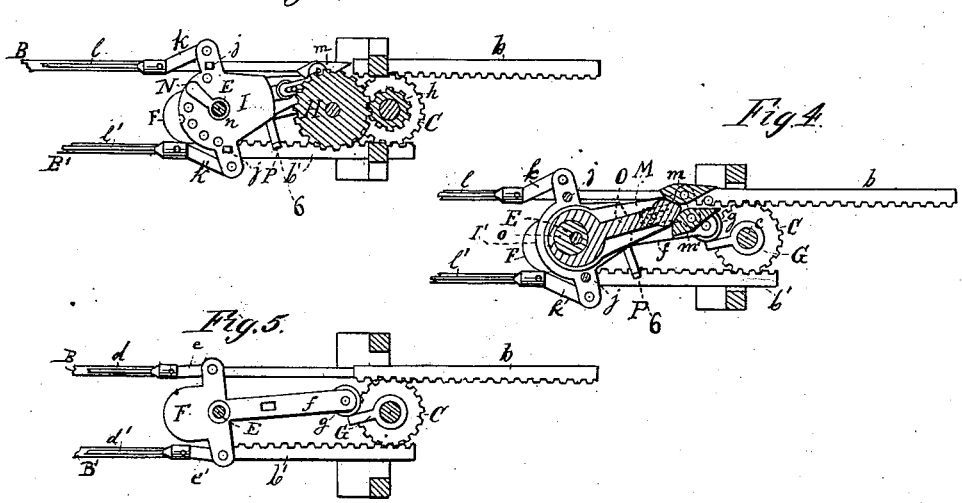
Witnesses:
F. B. Townsend
Rich'd N. Dyer
Inventor:
Charles P. Macowitzky
per Wm. H. Lotz
Attorney.

UNITED STATES PATENT OFFICE.

CHARLES P. MACOWITZKY, OF CHICAGO, ILLINOIS.

VALVE-GEAR FOR STEAM-ENGINES.

SPECIFICATION forming part of Letters Patent No. 227,119, dated May 4, 1880.

Application filed January 15, 1880.

*To all whom it may concern:*

Be it known that I, CHARLES P. MACOWITZKY, of Chicago, in the county of Cook and State of Illinois, have invented certain new and useful Improvements in Valve-Gear for Steam-Engines, of which the following is a specification.

The nature of my invention relates to that class of steam-engines in which the reciprocating motion of the pistons is applied direct, as for operating steam-pumps or reciprocating planing or grinding machines, or in which a band or rope wheel is oscillated back and forth, first one way and then in the opposite direction, for transmitting motion to reciprocating feathering-paddles for propelling canal-boats or other steam-vessels, or for any other purpose where such a movement can be utilized; and my object is to produce a simple, cheap, and compact engine which will use steam economically, and which will have simple and efficient means whereby the steam can be cut off at any point of the stroke, so as to be used expansively to any desired extent, or can be admitted to the cylinders throughout the stroke of the pistons, the exhaust-ports in either case being wide open throughout the stroke, so that there will be no resistance to the movement of the pistons.

My invention therein consists, first, in the combination, with a shaft having a gear-wheel and oscillated by racks on the piston-rods of the engine engaging with opposite sides of such gear-wheel, of a cam attached to the said oscillating shaft for operating a horizontally-swinging arm, to the opposite sides of the hub of which arm the main-valve stems are coupled, so as to move such main valves at or near the end of each stroke of the pistons; second, in a wheel rotated back and forth by a pinion on the oscillating shaft, and having a crank-pin, in combination with a slotted horizontally-swinging arm having connected to opposite sides of its hub the stems of the cut-off valves for operating said valves independently of the main valves; third, the horizontally-swinging arm for operating the cut-off valves, having pivoted jaws for engaging with the crank-pin on the gear-wheel, in combination with means for adjusting the width of the opening between such jaws, whereby the steam can be cut off at any point of the stroke; fourth, in the combination, with the swinging arms for operating the main and cut-off valves, of a cam for locking the driving-hub of the cut-off valves with the upper arm, having adjustable jaws, whereby the cut-off valves will be operated independently of the main valves, or with the lower arm, whereby the cut-off valves will move with the main valves, or for disconnecting said hub from both of such arms, whereby the cut-off valves can be worked by hand to start the engine; and, further, in the various other combinations of the operative parts, as fully hereinafter explained.

In the accompanying drawings, forming a part hereof, Figure 1 is a top view of the engine having two cylinders with the steam-chests removed and the valves exposed to view; Fig. 2, a longitudinal vertical section through the center of the same; Fig. 3, a sectional plan of the valve-gear on the line 3 in Fig. 2; Fig. 4, a sectional plan of the valve-gear on the line 4 in Fig. 2; Fig. 5, a similar section on line 5 in Fig. 2; and Fig. 6, a cross-section on line 6 in Figs. 2, 3, and 4.

Like letters denote corresponding parts in all the figures.

A A' are two steam-cylinders, having ports at each end for admitting and exhausting the steam.

B B' are the piston-rods, connected at one end to pistons which reciprocate within the cylinders. The other ends of the piston-rods are formed into or rigidly connected with rack-bars *b b'*, and between these rack-bars is placed a gear-wheel, C, which is keyed upon an upright shaft, *c*, and compels the pistons to move in opposite directions, whereby to said shaft *c* is imparted an oscillating movement. The diameter of the gear-wheel C is such that it will make a full revolution with each stroke of the pistons, first in one direction and then in the other.

D D' are the main valves, and *d d'* their stems, which stems are connected, by means of links *e e'*, with the diametrically-opposite wings of a hub, F, which hub is pivoted upon a standard, E, and has an arm, *f*, extending toward the oscillating shaft *c*, and provided with an anti-friction roller, *g*, in its end. A cam-arm, G, is mounted upon the shaft *c*, and is thrown by the oscillating movement of such shaft against the roller *g*, thereby swinging the arm *f* and turning the hub F, so as to change the position of the main valves D D' at the end of each stroke of the pistons.

Upon the upright shaft *c*, above the cam G, is mounted a pinion, *h*, which meshes with a gear-wheel, H, of just about twice the diameter of the said pinion, so that such gear-wheel H will make about one-half of a revolution during each stroke of the pistons. This gear-wheel H is loosely pivoted under the frame between the upright oscillating shaft and the cylinders, and has a crank-pin, *i*, projecting from its lower face.

I I' are two hub-plates pivoted upon the standard E, above the hub-plate F. The hub-plates I I' are connected together, a suitable distance apart, by studs *j*, and they have wings on their opposite sides, which are pivotally connected, by links *k*, with the stems *l l'* of the cut-off valves L L'. An arm, M, is pivoted upon the standard E, between the hub-plates I I', and next to the lower hub-plate, I', and has on its outer end two pivoted jaws, *m m'*, which inclose the crank-pin *i*, so that the oscillation of the gear-wheel H will vibrate said arm M. A sleeve, *n*, is placed over the standard E and extends down through the upper hub-plate, I. The lower end of this sleeve carries an eccentric, *o*, over which is placed the hub of a bar, O, the other end of which bar is of double-wedge shape, (see Fig. 4,) and works between the extended ends of the jaws *m m'* on the arm M, so that when said bar O is pushed forward the extended ends of the jaws *m m'* will be forced apart and the jaws themselves brought nearer together, and when such bar O is retracted the jaws will be opened to the same extent by the movement between them of the crank-pin *i*. The crank-pin *i* travels each time to the inner end of the slot formed by the jaws *m m'*, so that the extent of movement of the arm M is the same every time, no matter how the jaws are adjusted, the effect of adjusting such jaws being to change the bevel of the sides of the slot, and thereby make the movement of such arm commence sooner or later.

An adjusting-arm, N, is attached to the sleeve *n*, above the hub-plate I. By turning such arm in one direction it will be seen that the steam will be cut off nearer the first part of the stroke, while by turning the arm in the opposite direction the steam will be cut off nearer the end of the stroke.

The face of the plate I is graduated to show by the position of the arm N the distance that the steam acts by expansion.

In place of the eccentric *o* and bar O, a right-and-left-hand screw may be employed for adjusting the jaws *m m'*; or any other suitable device may be used.

P is a crank-shaft journaled under the end of the lower hub-plate, I', and having a cam, *p*, which works through a slot in the end of the said hub-plate. By turning the crank upward the cam *p* will enter a slot in the arm M and lock such arm to the hub-plates I I', whereby the vibrating movement of the arm will be imparted to the said hub-plates, and the cut-off valves will be operated independently of the main valves. By turning the crank downward the cam *p* will enter a slot in the arm *f*, when the cut-off valves will move with the main valves, and the engine will be supplied with steam throughout the stroke. By turning such crank to an intermediate position the cut-off valves can be operated by hand for starting the engine.

It will be readily understood that I can use the same devices for operating the valves of an engine having but one cylinder, the oscillating shaft receiving its motion from one reciprocating rack-bar instead of two.

What I claim as my invention is—

1. In a steam-engine, the combination, with the oscillating gear wheel and shaft operated by direct connection with the piston-rods, of a cam on such shaft and a swinging arm moved by such cam, the hub of the swinging arm being connected on opposite sides with the main-valve stems, so as to operate the main valves at the same time in opposite directions, substantially as described and shown.

2. The combination, with the oscillating shaft, of a gear-wheel oscillated back and forth by a pinion on such shaft, and having a crank-pin, and a slotted horizontally-swinging arm moved by such crank-pin and connected with the cut-off valves of the two cylinders, substantially as described and shown.

3. The combination, with the oscillating gear-wheel having crank-pin and the horizontally-swinging arm moved by such crank-pin, of the pivoted jaws on said arm, between which the crank-pin works, and devices, substantially as described, for adjusting said jaws, for the purpose set forth.

4. The combination, with the main and cut-off valves operated by connection with the oscillating hub-plates, of the locking-cam for locking the main and cut-off valves together, for locking the hub-plates to which the cut-off valves are connected to its operating-arm, and for disconnecting the cut-off valves from the moving parts, so that they can be worked by hand, substantially as described and shown.

5. In a steam-engine, the combination of the two cylinders having pistons moving in opposite directions and the rack-bars on the ends of the piston-rods with the gear-wheel rotated back and forth by such rack-bars, the oscillating shaft having a cam and a pinion, the swinging arm moved by the cam and connected with the main valves, the swinging arm having adjustable jaws, between which a crank-pin moves, which is carried by a wheel operated by said pinions, the oscillating hub-plates connected to the cut-off valves, and a cam for locking the said hub-plates to the moving parts, or for disconnecting the same therefrom, substantially as described and shown.

CHARLES P. MACOWITZKY.

Witnesses:
RICHD. N. DYER,
OLIVER W. MARBLE.